(12) United States Patent
Yang et al.

(10) Patent No.: US 11,942,754 B2
(45) Date of Patent: Mar. 26, 2024

(54) DRIVING CURRENT CORRECTION METHOD AND APPARATUS FOR MULTIPLE LASER DEVICES, AND LASER PROJECTOR

(71) Applicant: GOER OPTICAL TECHNOLOGY CO., LTD., Weifang (CN)

(72) Inventors: Lebao Yang, Shandong (CN); Xianbin Wang, Shandong (CN)

(73) Assignee: GOER OPTICAL TECHNOLOGY CO., LTD., Shandong Province (CN)

( * ) Notice: Subject to any disclaimer, the term of this patent is extended or adjusted under 35 U.S.C. 154(b) by 802 days.

(21) Appl. No.: 17/043,281

(22) PCT Filed: Sep. 27, 2018

(86) PCT No.: PCT/CN2018/107867
§ 371 (c)(1),
(2) Date: Sep. 29, 2020

(87) PCT Pub. No.: WO2019/214146
PCT Pub. Date: Nov. 14, 2019

(65) Prior Publication Data
US 2021/0036483 A1 Feb. 4, 2021

(30) Foreign Application Priority Data

May 9, 2018 (CN) .......................... 201810438094.9

(51) Int. Cl.
*H01S 3/131* (2006.01)
*G03B 21/20* (2006.01)
(Continued)

(52) U.S. Cl.
CPC .......... *H01S 3/131* (2013.01); *G03B 21/2033* (2013.01); *H01S 3/10069* (2013.01); *H01S 3/1305* (2013.01); *H01S 3/2383* (2013.01)

(58) Field of Classification Search
CPC .... H01S 3/131; H01S 3/10069; H01S 3/1305; H01S 3/2383; H01S 3/102; H01S 5/0607; G03B 21/2033; G03B 21/2053
(Continued)

(56) References Cited

U.S. PATENT DOCUMENTS 5,694,409 A * 12/1997 Taguchi .............. H01S 5/06832
372/29.011
5,982,790 A * 11/1999 Grossman ................. H01S 3/13
372/30

(Continued)

FOREIGN PATENT DOCUMENTS

CN 101540920 A 9/2009
CN 101897191 A 11/2010
(Continued)

OTHER PUBLICATIONS

First Office Action in Corresponding Chinese Application No. 201810438094. 9, dated May 8, 2019; 18 pgs.
(Continued)

*Primary Examiner* — Vu A Vu
(74) *Attorney, Agent, or Firm* — HAUPTMAN HAM, LLP (57) ABSTRACT

The present invention discloses a driving current correction method and apparatus for multiple laser devices, and a laser projector. A specific embodiment of the method includes in a projection period of a n-th pixel point: sequentially driving a plurality of laser devices of a laser source to emit laser, and respectively detecting light intensity information of lasers emitted from the plurality of laser devices by using a light sensor; acquiring an actual light intensity of the lasers emitted from the plurality of laser devices according to an electric signal output by the light sensor, and establishing a corresponding relation between a driving current and an actual light intensity of each laser device according to the
(Continued)

driving current of the each laser device and the actual light intensity of the laser emitted from the each laser device when the n-th pixel point is projected; from a projection of a (n+1)-th pixel point: correcting the driving current of the each laser device according to a set light intensity of the each laser device and the corresponding relation between the driving current and the actual light intensity of the each laser device. The implementation has a high consistency of detecting light intensity information that can be simply performed.

15 Claims, 2 Drawing Sheets

(51) Int. Cl.
*H01S 3/10* (2006.01)
*H01S 3/13* (2006.01)
*H01S 3/23* (2006.01)

(58) Field of Classification Search
USPC ................................................ 372/38.01
See application file for complete search history.

(56) References Cited

U.S. PATENT DOCUMENTS

| | | | | |
|---|---|---|---|---|
| 7,970,029 B2* | 6/2011 | Teramura | ............... | H01S 5/0683 |
| | | | | 372/38.01 |
| 8,178,826 B2* | 5/2012 | Ikegami | ............... | H04N 9/3155 |
| | | | | 372/29.014 |
| 9,825,420 B2* | 11/2017 | Nishioka | ................. | G09G 3/02 |
| 10,175,565 B1* | 1/2019 | Perkins | .............. | G03B 21/2066 |
| 2007/0159953 A1* | 7/2007 | Kamioka | ............ | G11B 7/13925 |
| 2009/0160833 A1* | 6/2009 | Brown | ..................... | G09G 3/02 |
| | | | | 345/207 |
| 2015/0077715 A1* | 3/2015 | Kawashiki | ........... | H04N 9/3129 |
| | | | | 353/31 |
| 2019/0279398 A1* | 9/2019 | Bai | ...................... | H04N 23/611 |

FOREIGN PATENT DOCUMENTS

| | | | |
|---|---|---|---|
| CN | 102445825 | A | 5/2012 |
| CN | 104038747 | A | 9/2014 |
| CN | 106980223 | A | 7/2017 |
| CN | 107045200 | A | 8/2017 |
| CN | 107229172 | A | 10/2017 |
| CN | 107465106 | A | 12/2017 |
| CN | 107728410 | A | 2/2018 |
| CN | 108646509 | A | 10/2018 |
| CN | 108666861 | A | 10/2018 |
| JP | 2009262427 | A | 11/2009 |
| JP | 2013257266 | A | 12/2013 |

OTHER PUBLICATIONS

International Search Report and Written Opinion issued in Corresponding International Application No. PCT/CN2018/107867, dated Dec. 12, 2018; 14 pgs.

Notification to Grant in Corresponding Chinese Application No. 201810438094. 9, dated Oct. 21, 2019; 3 pgs.

* cited by examiner in a projection period of a n-th pixel point: sequentially driving a plurality of laser devices of a laser source to emit laser, and respectively sensing light intensity information of lasers emitted from the plurality of laser devices by using a light sensor in a projection period of a n-th pixel point: acquiring an actual light intensity of the lasers emitted from the plurality of laser devices according to an electric signal output by the light sensor, and establishing a correspondence between a driving current and an actual light intensity of each laser device according to the driving current of the each laser device and the actual light intensity of the laser emitted from the each laser device when the n-th pixel point is projected from a projection of a (n+1)-th pixel point: correcting the driving current of the each laser device according to a set light intensity of the each laser device and the correspondence between the driving current and the actual light intensity of the each laser device

DRIVING CURRENT CORRECTION METHOD AND APPARATUS FOR MULTIPLE LASER DEVICES, AND LASER PROJECTOR

CROSS REFERENCE TO PRIOR APPLICATION

This application is a National Stage Patent Application of PCT International Patent Application No. PCT/CN2018/107867 (filed on Sep. 27, 2018) under U.S.C. § 371, which claims priority to Chinese Patent Application No. 201810438094.9 (filed on May 9, 2018), which are all hereby incorporated by reference in their entirety.

TECHNICAL FIELD

The invention relates to the technical field of laser. More specifically, the present invention relates to a driving current correction method and apparatus for multiple laser devices, and a laser projector.

BACKGROUND

Laser projection uses a laser source as a projection illumination light source. Since the directivity of the laser is good and the stray light of the laser is few, the color saturation is high, the projection picture looks bright, the color reduction degree is high, and the service life of the laser source is long.

Laser projection typically combines a RGB three-primary laser module with a MEMS (Micro-Electro-Mechanical Systems) micromirror. From a perspective of driving, it belongs to a scanning type projection display. Generally, a single-pixel scanning method is used, and the principle of the method is as follows. First, the RGB three-primary lasers are combined and shaped, then X-direction and Y-direction scanning is performed by the MEMS micromirror, and an image is projected on a projection screen. Specifically, an image de-modulator generates a laser driving signal and a scan driving signal according to an image signal; a laser driver sends laser driving currents to a plurality of laser devices in the laser source according to the laser driving signal respectively, so as to drive each laser device to synchronously emit a laser in accordance with a set light intensity that will projects pixel points; a beam combiner combines the laser beams emitted from the laser devices and a combined laser beam enters into a shaper; the combined laser beam shaped by the shaper enters the scanning vibrator (MEMS micromirror). The scanning vibrator performs X-direction and Y-direction scanning according to the scanning driving signal, as a result, the projection pixel points are projected one by one on the projection screen. Because the scanning frequency is high, the human eyes see the whole projection image and do not perceive the projection process from pixel to pixel.

Due to the difference in the factory performance of the laser devices in the laser source or the performance degradation after long-term use, the actual light intensity of the lasers emitted from the laser devices may be different from a set light intensity when the laser devices are driven at the set laser drive current, resulting in that the optimal projection image quality cannot be achieved. For example, the theoretical intensity value of a laser emitted from a laser device is 50 cd when the driving current is 2 A, however, for the foregoing reason, when the laser driver sends the driving current of 2 A to the laser according to the laser driving signal, the intensity of the laser emitted from the laser device is only 45 cd, which affects the quality of the projection image. In the prior art, the solution is to arrange a beam splitter and a light sensor on the light output path of each laser device. The light sensor arranged corresponding to the each laser device detects the actual light intensity of the laser emitted from the laser device, thereby realizing the monitoring of a plurality of laser devices and the correction of the driving current of the each laser device. This solution requires a plurality of beam splitters and a plurality of light sensors, resulting in that the laser source has too many optical components, the optical path is too complicated, the working temperature is high, the laser source is large and is difficult to be manufactured, the cost of the manufacture is high, and the consistency of monitoring cannot be ensured due to the use of the plurality of light sensors.

Therefore, there is a need to provide a driving current correction method and apparatus for multiple laser devices, and a laser projector, which are easy to implement and have a high consistency of detected light intensity information.

SUMMARY

The object of the present invention is to provide a driving current correction method and apparatus for multiple laser devices, and a laser projector, which have a high consistency of detecting light intensity information that can be simply performed.

To achieve the above object, the present invention adopts the following technical solutions.

A first aspect of the present invention provides a driving current correction method for multiple laser devices, including:

in a projection period of a n-th pixel point:
sequentially driving a plurality of laser devices of a laser source to emit laser, and respectively detecting light intensity information of lasers emitted from the plurality of laser devices by using a light sensor;
acquiring an actual light intensity of the lasers emitted from the plurality of laser devices according to an electric signal output by the light sensor, and establishing a corresponding relation between a driving current and an actual light intensity of each laser device according to the driving current of the each laser device and the actual light intensity of the laser emitted from the each laser device when the n-th pixel point is projected;
from a projection of a (n+1)-th pixel point:
correcting the driving current of the each laser device according to a set light intensity of the each laser device and the corresponding relation between the driving current and the actual light intensity of the each laser device.

Preferably, the method further comprises: amending an existing corresponding relation between a driving current and an actual light intensity of each laser device according to a driving current of each laser device and an actual light intensity of laser emitted from the each laser device when a current pixel point is projected, from the projection of the (n+1)-th pixel point.

Preferably,
the respectively detecting the light intensity information of the lasers emitted from the plurality of laser devices by using the light sensor further comprises: splitting the laser emitted from each laser device after optical paths being combined into a first laser for detecting and a second laser for projection, and detecting the light intensity information of the first laser by using the light sensor;

the acquiring the actual light intensity of the lasers emitted from the plurality of laser devices according to the electric signal output by the light sensor further comprises: calculating the actual light intensity of the laser emitted from the each laser device according to the electric signal output by the light sensor and a beam splitting ratio.

Preferably, the calculating the actual light intensity of the laser emitted from the each laser device according to the electric signal output by the light sensor and the beam splitting ratio further comprises:

calculating the actual light intensity of the laser emitted from the each laser device according to a pre-acquired corresponding relation between the electric signal output by the light sensor and a light intensity, the electric signal output by the light sensor, and the beam splitting ratio.

Preferably, the light intensity of the first laser after splitting the laser emitted from each laser device after optical paths being combined is much less than the light intensity of the second laser.

A second aspect of the present invention provides a driving current correction apparatus for multiple laser devices, comprising:

a laser driver, configured to sequentially drive a plurality of laser devices of a laser source to emit laser in a projection period of one pixel point;

a light sensor, configured to respectively detect light intensity information of lasers emitted from the plurality of laser devices;

a data processor, configured to, in a projection period of a n-th pixel point, acquire an actual light intensity of the lasers emitted from the plurality of laser devices according to the electric signal output by the light sensor, and establishes a corresponding relation between a driving current and an actual light intensity of each laser device according to the driving current of the each laser device and the actual light intensity of laser emitted from the each laser device when the n-th pixel point is projected; generate and transmit a driving current correction signal to the laser driver according to a set light intensity of the each laser device and the corresponding relation between the driving current and the actual light intensity of each laser device from a projection of a (n+1)-th pixel point;

a memory, configured to store the corresponding relation between the driving current and the actual light intensity of the each laser device.

Preferably, the data processor is configured to amend an existing corresponding relation between a driving current and an actual light intensity of each laser device according to a driving current of each laser device and an actual light intensity of laser emitted from the each laser device when a current pixel point is projected, from the projection of the (n+1)-th pixel point.

Preferably, the apparatus further comprises:

a beam splitter, configured to split the laser emitted from each laser device after optical paths being combined into a first laser for detecting and a second laser for projection, in which the light sensor is configured to detect light intensity information of the first laser; and wherein the data processor is further configured to calculate the actual light intensity of the laser emitted from the each laser device according to the electric signal output by the light sensor and a beam splitting ratio.

Preferably, the memory is further configured to store a pre-acquired corresponding relation between the electric signal output by the light sensor and a light intensity;

the data processor is further configured to calculate the actual light intensity of laser emitted from each laser device according to the corresponding relation between the electric signal output by the light sensor and the light intensity, the electric signal output by the light sensor, and the beam splitting ratio.

Preferably, a light intensity of the first laser after being split by the beam splitter is much less than a light intensity of the second laser.

A third aspect of the present invention provides a laser projector, including a laser source and the driving current correction apparatus for multiple laser devices provided in the second aspect of the present invention, in which the laser source includes a plurality of laser devices, a shaping collimator corresponding to the plurality of laser devices, a beam combiner, and a shaper, wherein the beam combiner is configured to combine optical paths of the lasers emitted from the laser devices, and the beam splitter is disposed behind the beam combiner.

Advantageous Effects of the Present Invention are as Follows

According to the technical solution of the present invention, it is possible to correct the driving current of each laser by using only one light sensor for detecting the light intensity information, which is simply performed and has high consistency in detecting the light intensity information.

BRIEF DESCRIPTION OF THE DRAWINGS

A further detailed descriptions of specific embodiment of the present invention are given below in conjunction with the accompanying drawings.

DETAILED DESCRIPTION

In order that the present invention may be more clearly described, the present invention will be further described with reference to the preferred embodiment and the accompanying drawings. Similar components are designated by the similar reference numerals in the drawings. It will be appreciated by those skilled in the art that the following detailed description is illustrative and not restrictive, and should not be taken to limit the scope of the invention.

Figure 1:
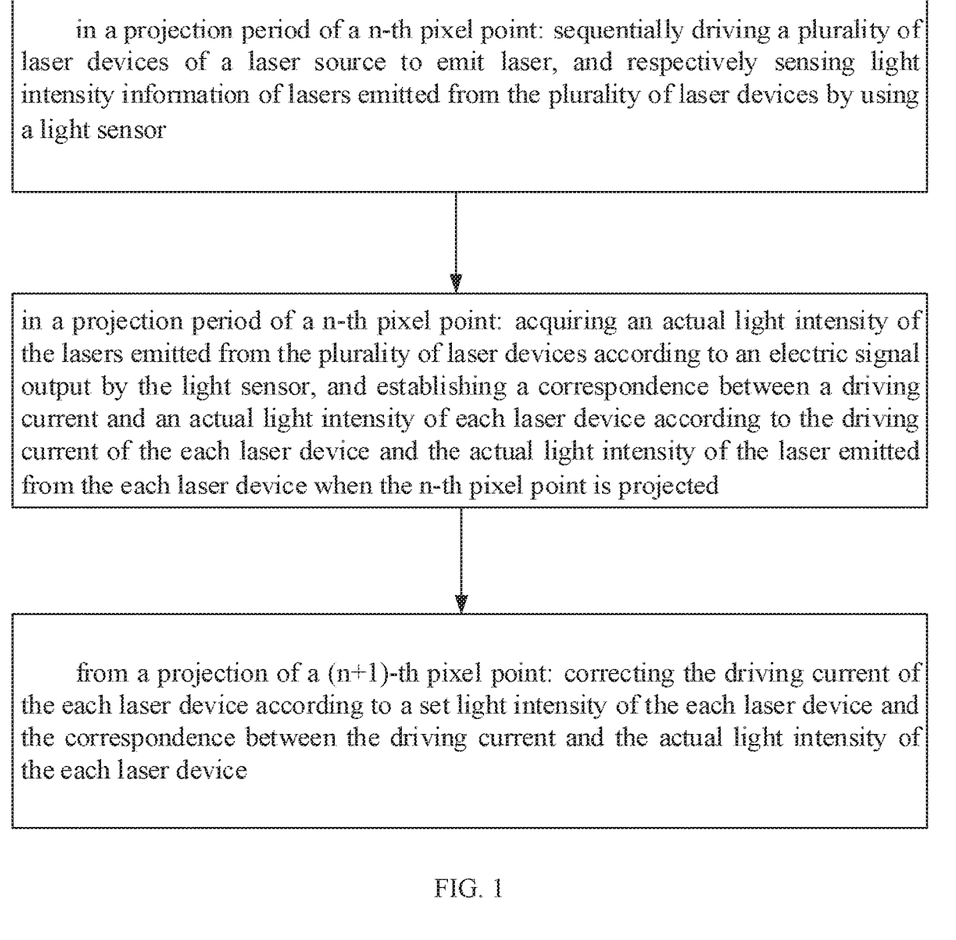
FIG. 1 shows a flowchart of a driving current correction method for multiple laser devices.

As shown in FIG. 1, an embodiment of the present invention provides a driving current correction method for multiple laser devices, including:

in a projection period of the n-th pixel point (n is a positive integer):

sequentially driving a plurality of laser devices of a laser source to emit lasers, and respectively detecting light intensity information of the lasers emitted from the plurality of laser devices by a light sensor;

acquiring an actual light intensity of the lasers emitted from the plurality of laser devices according to an electric signal output by the light sensor, and establishing a corresponding relation between the driving current and the actual light intensity of the each laser device according to the driving current of the each laser device and the actual light intensity of laser emitted from the each laser device when the n-th pixel point is projected;

from a projection of the (n+1)-th pixel point:

correcting the driving current of the each laser device according to a set light intensity of the each laser device and the corresponding relation between the driving current and the actual light intensity of the each laser device.

Wherein, when sequentially driving the plurality of laser devices of the laser source to emit lasers in a projection period of one pixel point, the $1^{st}$ laser device may be driven to emit laser first, and then the $2^{nd}$ laser device may be driven to emit laser while the $1^{st}$ laser device is stopped, and so on. In this case, the light intensity information detected by the light sensor is light intensity information of the lasers emitted from the plurality of laser devices sequentially. Alternatively, the $1^{st}$ laser device may be driven to emit laser first, then the $2^{nd}$ laser device may be driven to emit laser (in this case, the $1^{st}$ laser device is not stopped, that is, the $1^{st}$ and the $2^{nd}$ laser devices are simultaneously driven to emit laser), and so on. Since the light intensity of the laser emitted from a single laser within a projection period of a single pixel point is unchanged, in this case, the light intensity information detected by the light sensor sequentially is the light intensity information of the laser emitted from the $1^{st}$ laser device, the sum of the light intensity information of the laser emitted from the $1^{st}$ laser device and the light intensity information of the laser emitted from the $2^{nd}$ laser device, and so on. In subsequent steps, the actual light intensity of the lasers emitted from the plurality of laser devices during the projection period of this pixel point can be obtained directly by a simple proportional relationship corresponding relation.

For example, in the projection period of the $1^{st}$ pixel point, five laser devices of the laser source are sequentially driven to emit laser, and the actual light intensities of lasers emitted from the $1^{st}$ to $5^{th}$ laser devices are 1 A, 1.5 A, 2 A, 1.3 A, and 1.6 A, respectively, and the light intensity information of the lasers emitted from the five laser devices is detected in real time by the light sensor at the same time; the actual light intensities of the lasers emitted from the five laser devices are obtained according to the electrical signals output by the light sensor, in which the driving currents of the $1^{st}$ to $5^{th}$ laser devices are 25 cd, 30 cd, 55 cd, 48 cd, and 50 cd, respectively; and a corresponding relation between the driving current of the each laser device and the actual light intensity is established, in which the corresponding relation between the driving currents of the $1^{st}$ to $5^{th}$ laser devices and the actual light intensities is 1 A-25 cd, 1.5 A-30 cd, 2 A-55 cd, 1.3 A-48 cd, and 1.6 A-50 cd, respectively, and the corresponding relation between the driving currents of the laser devices and the actual light intensities is a linear relationship; and in the projection period of the $2^{nd}$ pixel point: the driving currents of the $1^{st}$ to the $5^{th}$ laser devices determined from the laser driving signals when the $2^{nd}$ pixel point is projected are corrected based on the set light intensities of the $1^{st}$ to the $5^{th}$ laser devices and the corresponding relation between the driving currents and the actual light intensities of the $1^{st}$ to the $5^{th}$ laser devices when the $2^{nd}$ pixel point is projected.

According to the driving current correction method for multiple laser devices provided in the present embodiment, by controlling timing of the driving current of each laser device so that the each laser device successively emits a laser in the projection period of one pixel point, it is possible to correct the driving currents of a plurality of laser devices by using only one light sensor that detect light intensity information, using fewer optical devices, simple optical path and lower cost, and the correction of the driving currents for the plurality of laser devices is easy to implement and has high consistency of detecting light intensity information. It should be noted that since the scanning frequency of the laser projection is very high and the projection period of a single pixel point is very short, in the present embodiment, the emitting period of one laser device is very short in the projection period of one pixel point and a whole projection image can be seen by a human eye, one cannot perceive the projection process from pixel to pixel, and not even the laser emitting process from laser device to laser device.

In some alternative implementations of the present embodiment, the method provided in the present embodiment further includes: amending an existing corresponding relation between a driving current and an actual light intensity of each laser device according to a driving current of each laser device and an actual light intensity of laser emitted from the each laser device when a current pixel point is projected, from the projection of the (n+1)-th pixel point. For example, in the projection period of the $1^{st}$ pixel point, a corresponding relation between the driving current and the actual light intensity of each laser device is established; from the projection of the $2^{nd}$ pixel point, the driving current of each laser is corrected according to the set light intensity of the each laser device and the corresponding relation between the driving current and the actual light intensity of the each laser device in the projection period of each pixel point, and the existing corresponding relation between the driving current and the actual light intensity of each laser device is amended according to the driving current and the actual light intensity of the each laser device when the current pixel point is projected. The correction may be performed by means of a mean value, a minimum variance, or the like. As the corresponding relation between the driving current and the actual light intensity of each laser device is constantly amended, the accuracy of the correction of the driving current becomes higher and higher.

Figure 2:
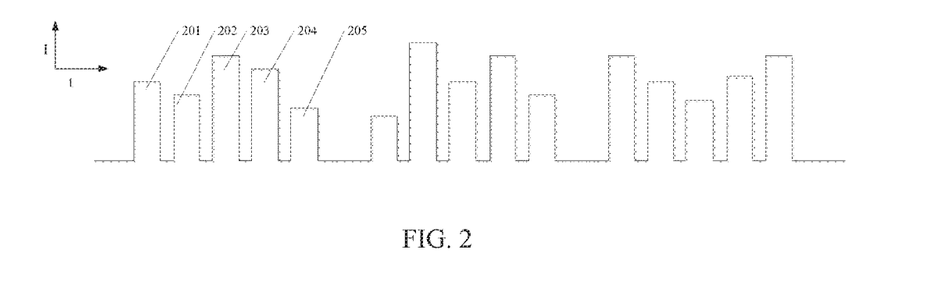
FIG. 2 shows a waveform diagram of the driving current.

In some alternative implementations of the present embodiment, within the projection period of each pixel point, the length of the period in which each laser device emits the laser is the same. Further, there is a time interval of equal-length between adjacent periods of the lasers emitted from each laser device in the projection period of each pixel point. For example, as shown in FIG. 2, in the projection period of one pixel point, the waveforms of the driving currents of the $1^{st}$ to $5^{th}$ laser devices are 201 to 205, respectively, and the $1^{st}$ to $5^{th}$ laser devices sequentially emit lasers at fixed time intervals. In this way, it is easy to implement control when the actual light intensities of the lasers emitted from the plurality of laser devices are obtained according to the electrical signals output by the light sensor while respectively detecting the light intensity information of the lasers emitted from the plurality of laser devices. It can also avoid mutual interference between the lasers emitted from the plurality of laser devices due to the influence of factors such as the accuracy of laser driving timing. And the accuracy of the actual light intensity obtained can be ensured.

In some alternative implementations of the present embodiment, the respectively detecting the light intensity information of the lasers emitted from the plurality of laser devices by using the light sensor further includes: splitting the laser emitted from each laser device after optical paths being combined into a first laser for detecting and a second laser for projection, and detecting the light intensity information of the first laser by using the light sensor; and the acquiring the actual light intensity of the lasers emitted from the plurality of laser devices according to the electric signal output by the light sensor further includes: calculating the actual light intensity of the laser emitted from the each laser device according to the electric signal output by the light sensor and a beam splitting ratio.

In some alternative implementations of the present embodiment, calculating the actual light intensity of laser emitted from each laser device according to the electrical signal output by the light sensor and the beam splitting ratio further includes:

calculating the actual light intensity of the laser emitted from the each laser device according to a pre-acquired corresponding relation between the electric signal output by the light sensor and a light intensity, the electric signal output by the light sensor, and the beam splitting ratio.

Here, the corresponding relation between the electric signal output by the light sensor and the light intensity can be obtained by a pre-test of the light sensor.

In some alternative implementations of the present embodiment, the light intensity of the first laser after splitting the laser emitted from each laser device after optical paths being combined is much less than the light intensity of the second laser. In this way, the influence of the beam splitting on the laser for projection may be reduced, and the quality of the laser projection picture may be ensured.

Another embodiment of the present invention provides a driving current correction apparatus for multiple laser devices, including:

a laser driver that sequentially driving a plurality of laser devices of a laser source to emit laser in a projection period of a single pixel point;

a light sensor that respectively detects light intensity information of the lasers emitted from the plurality of laser devices;

a data processor that, in a projection period of a n-th pixel: sequentially drives the plurality of laser devices of a laser source to emit lasers, and respectively detects the light intensity information of the lasers emitted from the plurality of laser devices by using the light sensor; acquires an actual light intensity of the lasers emitted from the plurality of laser devices according to the electric signal output by the light sensor, and establishes a corresponding relation between a driving current and an actual light intensity of each laser device according to the driving current of the each laser device and the actual light intensity of the laser emitted from the each laser device when the n-th pixel point is projected; generates and transmits a driving current correction signal to the laser driver according to the set light intensity of each laser device and the corresponding relation between the driving current and the actual light intensity of the each laser device from the projection of the (n+1)-th pixel point; and a memory that stores the corresponding relation between the driving current and the actual light intensity of the each laser device.

It will be appreciated that the memory may be an integrated local memory device, or an extended memory device, such as a pluggable memory card, which is not specifically limited in the present embodiment.

According to the driving current correction apparatus for multiple laser devices provided in the present embodiment, by controlling timing of the driving current of each laser device so that the each laser device successively emits a laser in the projection period of one pixel point, it is possible to correct the driving currents of a plurality of laser devices by using only one light sensor that detects light intensity information, using fewer optical devices, simple optical path, and lower cost, and the correction of the driving currents for the plurality of laser devices is easy to implement and has high consistency of detecting light intensity information.

In some alternative implementations of the present embodiment, the data processor in the apparatus of the present embodiment amends an existing corresponding relation between a driving current and an actual light intensity of each laser device according to a driving current of each laser device and an actual light intensity of laser emitted from the each laser device when a current pixel point is projected, from the projection of the (n+1)-th pixel point. Here, the data processor may implement the correction by means of a mean value, a minimum variance, or the like. As the data processor constantly amends the corresponding relation between the driving current and the actual light intensity of each laser device, the accuracy of the data processor in correcting the driving current becomes higher and higher.

In some alternative implementations of the present embodiment, within the projection period of each pixel point, the length of the period in which each laser device emits the laser is the same. Further, there is a time interval of equal-length between adjacent periods of lasers emitted from each laser device in the projection period of each pixel point. In this way, it is easy to implement control when the actual light intensities of the lasers emitted from the plurality of laser devices are obtained according to the electrical signals output by the light sensor while respectively detecting the light intensity information of the lasers emitted from the plurality of laser devices. It can also avoid mutual interference between the lasers emitted from the plurality of laser devices due to the influence of factors such as the accuracy of the laser driving timing. And the accuracy of the actual light intensity obtained by the light sensor can be ensured.

In some alternative implementations of the present embodiment, the apparatus provided in the present embodiment further includes:

a beam splitter that splits the laser emitted from each laser device 301 after optical paths being combined into a first laser for detecting and a second laser for projection, the light sensor detects the light intensity information of the first laser; and a data processor for calculating the actual light intensity of the laser emitted from the each laser device according to the electric signal output by the light sensor and a beam splitting ratio.

In some alternative implementations of the present embodiment, the memory further stores a pre-acquired corresponding relation between the electric signal output by the light sensor and the light intensity;

the data processor is configured to calculating the actual light intensity of the laser emitted from the each laser device according to the corresponding relation between the electric signal output by the light sensor and the light intensity, the electric signal output by the light sensor, and the beam splitting ratio.

Here, the corresponding relation between the electric signal output by the light sensor and the light intensity can be obtained by a pre-test of the light sensor by a test system.

In some alternative implementations of the present embodiment, the light intensity of the first laser after being split by the beam splitter in the apparatus of the present embodiment is much less than the light intensity of the second laser. In this way, the influence of the beam splitting on the laser for projection may be reduced, and the quality of the laser projection picture may be ensured.

Figure 3:
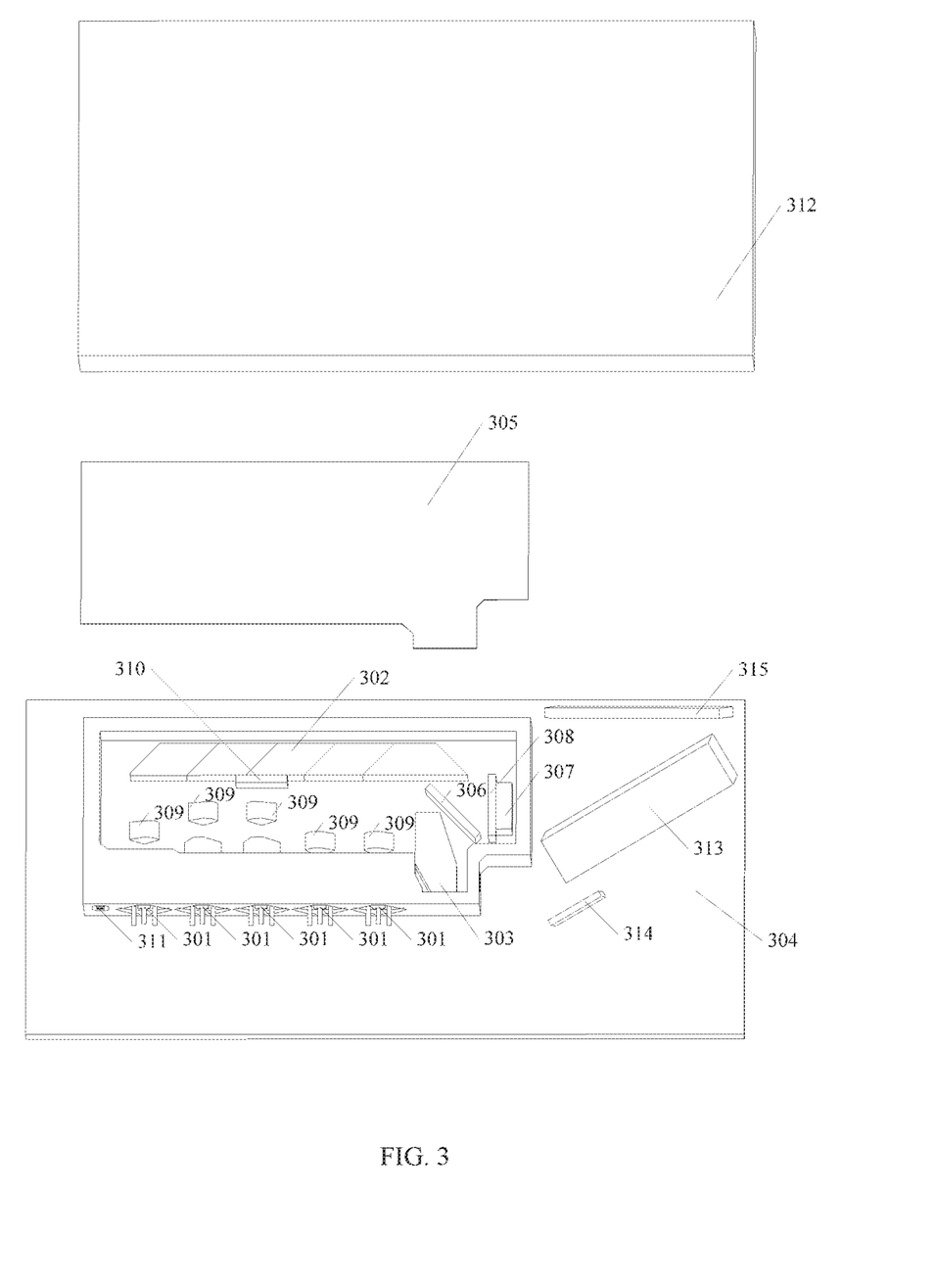
FIG. 3 shows a schematic view of a laser projector.

As shown in FIG. 3, another embodiment of the present invention provides a laser projector that includes a laser source including a plurality of laser devices 301, a shaping collimator corresponding to the plurality of laser devices 301, a beam combiner 302, and a shaper 303; a driving current correction apparatus for a multiple laser devices including a laser driver (not shown in the figure), a data processor (not shown in the figure), a memory (not shown in the figure), a beam splitter 306 which is disposed between the beam combiner 302 and the shaper 303, and a light sensor 307; and a MEMS micromirror 113 which is disposed on the output light path of the laser source.

The beam splitter 306 is disposed between the beam splitter 302 and the shaper 303, in this case, the light sensor 307 is located on the first output light path of the beam splitter 306 and the shaper 303 is located on the second output light path of the beam splitter 306. The shaping collimator is used to shape the spot size of the laser emitted from each laser 301 and collimate the laser. The shaper 303 is used to shape the spot size of the laser incident on the shaper 303 through the beam splitter 306.

The beam splitter may also be provided on the output light path (not shown in FIG. 3) of the shaper for shaping the spot size of the laser incident on the shaper after being combined the light path by the beam splitter. The light sensor is located on the first output light path of the beam splitter, and the laser of the second output light path of the beam splitter serves as an output beam of the laser source.

Taking the beam splitter 306 being disposed between the beam combiner 302 and the shaper 303 as an example, the beam splitter 306 splits the laser beam after being combined by the beam combiner 302 into two beams, one of which enters the light sensor 307 and the other enters the shaper 303. The spot size of the other beam is shaped through the shaper 303 and then serves as the output laser of the laser source. The output laser of the laser source is projected onto the MEMS micromirror 113 so that an image can be projected on the projection screen.

A laser driver sequentially drives a plurality of laser devices 301 of a laser source to emit laser in a projection period of a single pixel point.

A beam splitter 306 splits the laser emitted from each laser device 301 after optical paths being combined into a first laser for detecting and a second laser for projection, the light sensor 307 detects the light intensity information of the first laser.

A light sensor 307 respectively detects light intensity information of the lasers emitted from the plurality of laser devices 301.

A data processor: in the projection period of the n-th pixel, calculates the actual light intensity of acquired laser emitted from the plurality of laser devices 301 according to the electric signal output by the light sensor 307 and a beam splitting ratio, and establishes a corresponding relation between a driving current and an actual light intensity of each laser device 301 according to the driving current of the each laser device 301 and the actual light intensity of the laser emitted from the each laser device 301 when the n-th pixel point is projected; generates and transmits a driving current correction signal to the laser driver according to the set light intensity of the each laser device 301 and the corresponding relation between the driving current and the actual light intensity of the each laser device 301 from the projection of the (n+1)-th pixel point.

A memory stores the corresponding relation between the driving current and the actual light intensity of the each laser device 301.

According to the laser projector provided in the present embodiment, by controlling timing of the driving current of each laser device 301 so that the each laser device 301 successively emits a laser in the projection period of one pixel point, it is possible to correct the driving currents of the plurality of laser devices 301 by using only one light sensor 307 that detects light intensity information, using fewer optical devices, simple optical path, and lower cost, and the correction of the driving currents for the plurality of laser devices is easy to implement and has high consistency of detecting light intensity information.

In some alternative implementations of the present embodiment, the data processor amends an existing corresponding relation between a driving current and an actual light intensity of each laser device 301 according to the driving current of the each laser device 301 and the actual light intensity of the laser emitted from the each laser device 301 when the current pixel point is projected, from the (n+1)-th pixel point of the projection. Here, the data processor may implement the correction by means of a mean value, a minimum variance, or the like. As the data processor constantly amends the corresponding relation between the driving current and the actual light intensity of each laser device 301, the accuracy of the data processor in correcting the driving current becomes higher and higher.

In some alternative implementations of the present embodiment, within the projection period of each pixel point, the length of the period in which each laser device 301 emits the laser is the same. Further, there is a time interval of equal-length between adjacent periods of the laser emitted from each laser device in the projection period of each pixel point. In this way, it is easy for the data processor to implement control when the actual light intensity of the lasers emitted from the plurality of laser devices 301 is obtained according to the electrical signals output by the light sensor 307 while respectively detecting the light intensity information of the lasers emitted from the plurality of laser devices 301. It can also avoid mutual interference between the lasers emitted from the plurality of laser devices 301 due to the influence of factors such as the accuracy of the laser driving timing. And the accuracy of the actual light intensity obtained by the data processor can be ensured.

In some alternative implementations of the present embodiment,
the memory further stores a pre-acquired corresponding relation between the electric signal output by the light sensor 307 and the light intensity;
the data processor is configured to calculating the actual light intensity of laser emitted from the each laser device 301 according to the corresponding relation between the electric signal output by the light sensor 307 and the light intensity, the electric signal output by the light sensor 307, and the beam splitting ratio.

Here, the corresponding relation between the electric signal output by the light sensor 307 and the light intensity can be obtained by a pre-test of the light sensor 307 by a test system.

In some alternative implementations of the present embodiment, the light intensity of the first laser after being split by the beam splitter 306 is much less than the light intensity of the second laser. In this way, the influence of the beam splitting on the laser for projection may be reduced, and the quality of the laser projection picture may be ensured. That is, the light intensity of the beam incident on the light sensor 307 after passing through the beam splitter 306 is much less than the light intensity of the beam incident on the beam splitter 306. Similarly, taking the beam splitter 306 being disposed between the beam combiner 302 and the shaper 303 as an example, the light intensity of the beam incident on the light sensor 307 after passing through the beam splitter 306 is much less than the light intensity of the beam incident on the beam splitter 306, that is, the beam splitter 306 splits the laser beam after being combined by the beam combiner 302 into two beams, and the light intensity of one laser beam incident on the light sensor 307 is much less than the light intensity of the other laser beam incident on the shaper 303. In a specific implementation, taking each laser 301 emitting P-state polarized light as an example, the light intensity of the beam of the first light path from the beam splitter 306 is about 0.8% of the sum of the light intensities of the beam of the first optical path and the beam of the second optical path from the beam splitter 306.

In some alternative implementations of the present embodiment, the beam splitter 306 is flat glass and the incident angle of the beam incident on the flat glass is 45°±20°. When the beam passes through the flat glass, a small part of the beam is reflected, and the light intensity of the reflected small part of the beam accounts for about 0.8% of the total light intensity. Therefore, by transmitting the reflected light on the surface of the flat glass that is not plated with a high-transmittance film into the light sensor 307 and transmitting the transmission light into the shaper 303, the beam splitting requirement of the present embodiment can be achieved and the beam splitting proportion requirement of the present embodiment is basically met. In addition, since the reflection ratio of the flat glass is related to the incident angle of the incident beam, in this embodiment, the incident angle of the beam to be incident on the flat glass is 45°±20°. The incident angle of the flat glass 45°±20° may be achieved by adjusting the position or angle between the beam combiner 302 or the shaper 303 and the flat glass. It should be noted that the spectral performance (or reflection performance) of the flat glass is related to the polarization state of the laser and has nothing to do with the wavelength of the laser. If the beam splitter 306 does not use flat glass, but uses other forms such as plated optical elements or the like, since the operating temperature of each laser device 301 and its packaging environment will increase after the each laser device 301 is driven to emit laser or after the laser projector starts to work, then, the center wavelength of the laser emitted from the each laser device 301 will change. Using other forms of beam splitter 306, such as plated optical components or the like, because of the plating, changes in the wavelength of the laser emitted from each laser device 301 due to changes in the operating temperature will cause changes in the spectral performance of the beam splitter 306, thereby affecting the accuracy of the data processor in obtaining the actual light intensity. Therefore, the effect of temperature drift can be eliminated by using flat glass as the beam splitter 306. The data processor calculates the actual light intensity of laser emitted from each laser device 301 according to the corresponding relation between the electric signal output by the light sensor 307 and the light intensity, the electric signal output by the light sensor 307, and the beam splitting ratio with high accuracy.

In some alternative implementations of the present embodiment, one of the surfaces of the flat glass is plated with a high-permeability film. Since only one surface is required for reflection, the other surface may be plated with a high-transparency film to reduce the light intensity loss of the laser emitted from the laser source, that is, the light intensity loss of the laser used for projection is reduced.

In some alternative implementations of the present embodiment, the light sensor 307 is a photodiode (Photo Diode). In a case where the normal operating range of the photodiode defines that the intensity value of its detected light intensity is small, the driving current correction apparatus for the multiple laser devices further includes a laser attenuator 308 disposed between the beam splitter 307 and the photodiode. In this case, when calculating the actual light intensity of the laser emitted from each laser device 301 by the data processor, it is only necessary to make a corresponding calculation is made based on the attenuation multiple of the light intensity by the laser attenuator 308.

In some alternative implementations of the present embodiment, the shaping collimator includes a plurality of shaping collimators 309 corresponding to the plurality of laser devices 301.

In some alternative implementations of the present embodiment, the plurality of laser devices 301 emit P-state polarized light or S-state polarized light respectively, thereby facilitating the fabrication of the plurality of laser devices 301, for example, facilitating the routing of input driving signals of the plurality of laser devices 301.

In some alternative implementations of the present embodiment, the plurality of laser devices 301 include a green light laser device, a blue light laser device, and two red light laser devices, and a wave plate 310 disposed between the shaping collimator corresponding to one of the two red light laser devices and the beam combiner 302. Since a red light laser devices is relatively sensitive to the operating temperature, when the operating temperature is between 50° C. to 60° C., its light output efficiency is only about 65% of the light output efficiency in the operating temperature between −10° C. to 40° C. Therefore, with two red light laser devices, it is possible to reduce the power of a single red light laser device while ensuring the overall red light intensity of the laser source, thereby reducing the operating temperature of the single red light laser device and the operating temperature in its packaging environment. In addition, even if the operating temperature is relatively high, and the light output efficiency of the red light laser device decreases, the two red light laser devices can ensure the overall red light intensity of the laser source to avoid color distortion of the projected image due to the increase in operating temperature and the decrease in the overall red light intensity of the laser source. When two red light laser devices are used, since the wavelengths of the lasers emitted from the two red light laser devices are the same, while the wave plate 310 disposed between the shaping collimator corresponding to one of the two red light laser devices and the beam combiner 302 changes the polarization state of the laser or sets the angle of beam directions of the two red light laser devices to 90°, the beam combiner 302 can achieve beam combining (the principle of the beam combiner 302 in this embodiment realizes the beam combining of different wavelength lasers is: if each "45° angle bevel mirror" corresponding to the laser device 301 in the combiner 302 shown in FIG. 3 is coated with an optical film, which only reflects laser beams of certain specific wavelengths and polarization states, and transmits other laser beams, the combiner 302 combines the laser beams with different wavelengths through the optical film). Herein, the wave plate 310 is preferably a half-wave plate.

In some alternative implementations of the present embodiment, the plurality of laser devices 301 further include an infrared laser device that may cooperate with other devices to perform functions such as touch control, feedback, and distance measurement or the like when the laser projector is a touch-control laser projector.

In specific implementation, this embodiment does not limit the arrangement of the infrared laser device, the green light laser device, the blue light laser device, and the two red light laser devices. In the case of side-by-side arrangement from left to right as shown in FIG. 3, the infrared laser device, the red light laser device, the red light laser device, the green light laser device, and blue light laser device may be arranged in order from left to right, they may also be arranged in order from left to right as the blue light laser device, the green light laser device, the red light laser device, the red light laser device, the infrared laser, etc.

In some alternative implementations of the present embodiment, the laser source further includes a light source housing, in which an inner cavity formed by the light source housing accommodates a plurality of laser devices 301, a shaping collimator, a beam combiner 302, a shaper 303, a beam splitter 306, a photo-sensor 307, a laser attenuator 308, and a wave plate 310. The light source housing is provided with a light outlet. That is, the beam splitter 306, the photo-sensor 307, and the laser attenuator 308 in the driving current correction apparatus for multiple laser devices are accommodated in the inner cavity formed by the light source housing together with the devices of the laser source. The laser projector according to the present embodiment further includes a device cover plate 312 and a device substrate, in which the device cover plate 312 and the device substrate cooperate to form a device housing, the laser source and the MEMS micromirror 313 are housed in an inner cavity of the device housing, the MEMS micromirror 313 is disposed on an light path of the laser source, the device housing is provided with an light outlet, and the light output of the MEMS micromirror 313 is emitted from the light outlet formed on the device housing. In this way, since the above-mentioned devices are encapsulated in an inner cavity formed by a light source housing independent of the MEMS micromirror 113, if the size of the laser projector needs to be adjusted, the device housing of the laser projector can be directly operated when the position of the light source housing is not involved, and the light source housing can ensure the sealing and dustproof property of the devices in the inner cavity thereof.

In some alternative implementations of the present embodiment, the laser source further includes a thermistor 311 housed in the cavity formed by the light source housing, the thermistor 311 is adapted to detect the temperature in the cavity formed by the light source housing, and may monitor the temperature in cooperation with other devices.

In some alternative implementations of the present embodiment, the light source housing includes a substrate 304 and a light source cover plate 305, the substrate 304 and the light source cover plate 305 cooperate to form the light source housing, and the above-mentioned devices are fixed on the substrate 304. The substrate 304 and the light source cover plate 305 may be connected in various forms such as buckling. The substrate 304 may form, on its top surface, a convex annular enclosure which is connected to the light source cover plate 305 to form an interior cavity; the interior cavity may also be formed by using a removable annular enclosure together with the substrate 304 and the light source cover plate 305. The optional connection manner between the device cover plate 312 and the device substrate is similar to that between the light source cover plate 305 and the substrate 304 described above, and details are not described herein. In addition, the device substrate and the substrate 304 forming the light source housing may be one substrate, i.e., the device substrate is the substrate 304, and the substrate 304 and the light source cover plate 305 cooperate to form the light source housing, and the substrate 304 and the device cover plate 312 cooperate to form the device housing.

In some alternative implementations of the present embodiment, the light outlet of the device housing is provided with a full lens 315. The full-transmission lens 315, which may also be referred to as a window glass, may ensure the sealability of the device housing.

In some alternative implementations of the present embodiment, the laser projector provided in the present embodiment further includes a reflector 314 housed in the inner cavity of the device housing and disposed between the laser source and the MEMS micromirror 313. If the projection direction needs to be adjusted, the device cover plate 312 may be opened, and the angle at which the laser source enters the MEMS micromirror 313 may be adjusted by adjusting the position or the reflection direction of the mirror 314.

In the description of the present invention, it is to be noted that orientation or position relationship referred by the terms of "upper", "below" or the like is based on the orientation or positional relationship shown in the drawings, and is just to facilitate the description of the present invention and simplify the description, rather than indicating or implying that the device or element has a specific orientation and is constructed and operated in a specific orientation. Thus, it cannot be understood as a limitation to the present invention. Unless otherwise clearly specified and defined, the terms "install", "connect", and "coupled" should be understood in a broad sense, for example, it can be a fixed connection, a detachable connection, or an integral connection; it can be a mechanical connection, also can be an electrical connection; it can be directly connected, or it can be indirectly connected through an intermediary, or it can be a connection between two components. Those of ordinary skill in the art can understand the specific meanings of the above terms in the present invention according to specific situations.

It should also be noted that in the description of the present invention, relational terms such as first and second and the like are used merely to distinguish one entity or operation from another entity or operation, without necessarily requiring or implying any such actual relationship or order between such entities or operations. Moreover, the terms "include" "comprise" or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without more limitations, for the elements defined by the sentence "include a . . . ", it does not exclude that there are other identical elements in the process, method, article or apparatus that includes the elements.

Obviously, the above-described embodiments of the present invention are merely illustrative of the present invention and are not intended to limit the embodiments of the present invention. Those skilled in the art, on the basis of the above description, will be able to make other modifications or variations, which are not intended to be exhaustive of all the embodiments. Obvious modifications or variations derived from the solutions of the present invention will fall within the scope of the present invention.

The invention claimed is:

1. A driving current correction method for multiple laser devices, comprising:
in a projection period of a n-th pixel point
sequentially driving a plurality of laser devices of a laser source to emit laser, and respectively detecting light intensity information of lasers emitted from the plurality of laser devices by using a light sensor;
acquiring an actual light intensity of the lasers emitted from the plurality of laser devices according to an electric signal output by the light sensor, and establishing a corresponding relation between a driving current and an actual light intensity of each laser device according to the driving current of the each laser device and the actual light intensity of the laser emitted from the each laser device when the n-th pixel point is projected;
from a projection of a (n+1)-th pixel point, wherein the (n+1)-th pixel point is a pixel point next to the n-th pixel point in a scanning direction:
correcting the driving current of the each laser device according to a set light intensity of the each laser device and the corresponding relation between the driving current and the actual light intensity of the each laser device, wherein the corresponding relation between the driving current and the actual light intensity of the each laser is a linear relationship.

2. The method according to claim 1, further comprising: amending an existing corresponding relation between a driving current and an actual light intensity of each laser device according to a driving current of each laser device and an actual light intensity of laser emitted from the each laser device when a current pixel point is projected, from the projection of the (n+1)-th pixel point.

3. The method according to claim 1, wherein
the respectively detecting the light intensity information of the lasers emitted from the plurality of laser devices by using the light sensor further comprises: splitting the laser emitted from each laser device after optical paths being combined into a first laser for detecting and a second laser for projection, and detecting the light intensity information of the first laser by using the light sensor; and
the acquiring the actual light intensity of the lasers emitted from the plurality of laser devices according to the electric signal output by the light sensor further comprises: calculating the actual light intensity of the laser emitted from the each laser device according to the electric signal output by the light sensor and a beam splitting ratio.

4. The method of claim 3, wherein the calculating the actual light intensity of the laser emitted from the each laser device according to the electric signal output by the light sensor and the beam splitting ratio further comprises:
calculating the actual light intensity of the laser emitted from the each laser device according to a pre-acquired corresponding relation between the electric signal output by the light sensor and a light intensity, the electric signal output by the light sensor, and the beam splitting ratio.

5. The method according to claim 3, wherein the light intensity of the first laser after splitting the laser emitted from each laser device after optical paths being combined is much less than the light intensity of the second laser.

6. The method according to claim 1, wherein a time order of each laser device emitting a laser is controlled to make the each laser device successively emit the laser in a projection period of one pixel point.

7. The method according to claim 1, wherein within a projection period of one pixel point, each laser device emits a laser for a same time.

8. A driving current correction apparatus for multiple laser devices, comprising:
a laser driver, configured to sequentially drive a plurality of laser devices of a laser source to emit laser in a projection period of a single pixel point;
a light sensor, configured to respectively detect light intensity information of lasers emitted from the plurality of laser devices;
a data processor, configured to, in a projection period of a n-th pixel point, acquire an actual light intensity of the lasers emitted from the plurality of laser devices according to the electric signal output by the light sensor, and establish a corresponding relation between a driving current and an actual light intensity of each laser device according to the driving current of the each laser device and the actual light intensity of laser emitted from the each laser device when the n-th pixel point is projected; generate and transmit a driving current correction signal to the laser driver according to a set light intensity of the each laser device and the corresponding relation between the driving current and the actual light intensity of each laser device from a projection of a (n+1)-th pixel point; and
a memory, configured to store the corresponding relation between the driving current and the actual light intensity of the each laser device,
wherein the corresponding relation between the driving current and the actual light intensity of the each laser is a linear relationship and the (n+1)-th pixel point is a pixel point next to the n-th pixel point in a scanning direction.

9. The apparatus according to claim 8, wherein the data processor is configured to amend an existing corresponding relation between a driving current and an actual light intensity of each laser device according to a driving current of each laser device and an actual light intensity of laser emitted from the each laser device when a current pixel point is projected, from the projection of the (n+1)-th pixel point.

10. The apparatus of claim 8, further comprising:
a beam splitter, configured to split the laser emitted from each laser device after optical paths being combined into a first laser for detecting and a second laser for projection, in which the light sensor is configured to detect light intensity information of the first laser; and
wherein the data processor is further configured to calculate the actual light intensity of the laser emitted from the each laser device according to the electric signal output by the light sensor and a beam splitting ratio.

11. The apparatus according to claim 10, wherein
the memory is further configured to store a pre-acquired corresponding relation between the electric signal output by the light sensor and a light intensity;
the data processor is further configured to calculate the actual light intensity of laser emitted from each laser device according to the corresponding relation between the electric signal output by the light sensor and the light intensity, the electric signal output by the light sensor, and the beam splitting ratio.

12. The apparatus according to claim 10, wherein a light intensity of the first laser after being split by the beam splitter is much less than a light intensity of the second laser.

13. A laser projector, comprising a laser source and the driving current correction apparatus for multiple laser devices according to claim 10, wherein the laser source includes a plurality of laser devices, a shaping collimator corresponding to the plurality of laser devices, a beam combiner, and a shaper, wherein the beam combiner is configured to combine optical paths of the lasers emitted from the laser devices, and the beam splitter is disposed behind the beam combiner.

14. A laser projector, comprising a laser source and the driving current correction apparatus for multiple laser devices according to claim 11, wherein the laser source includes a plurality of laser devices, a shaping collimator corresponding to the plurality of laser devices, a beam combiner, and a shaper, wherein the beam combiner is configured to combine optical paths of the lasers emitted from the laser devices, and the beam splitter is disposed behind the beam combiner.

15. A laser projector, comprising a laser source and the driving current correction apparatus for multiple laser devices according to claim 12, wherein the laser source includes a plurality of laser devices, a shaping collimator corresponding to the plurality of laser devices, a beam combiner, and a shaper, wherein the beam combiner is configured to combine optical paths of the lasers emitted from the laser devices, and the beam splitter is disposed behind the beam combiner.

\* \* \* \* \*